(No Model.)
A. WURTS.
LIGHTNING ARRESTER.
No. 494,186. Patented Mar. 28, 1893.
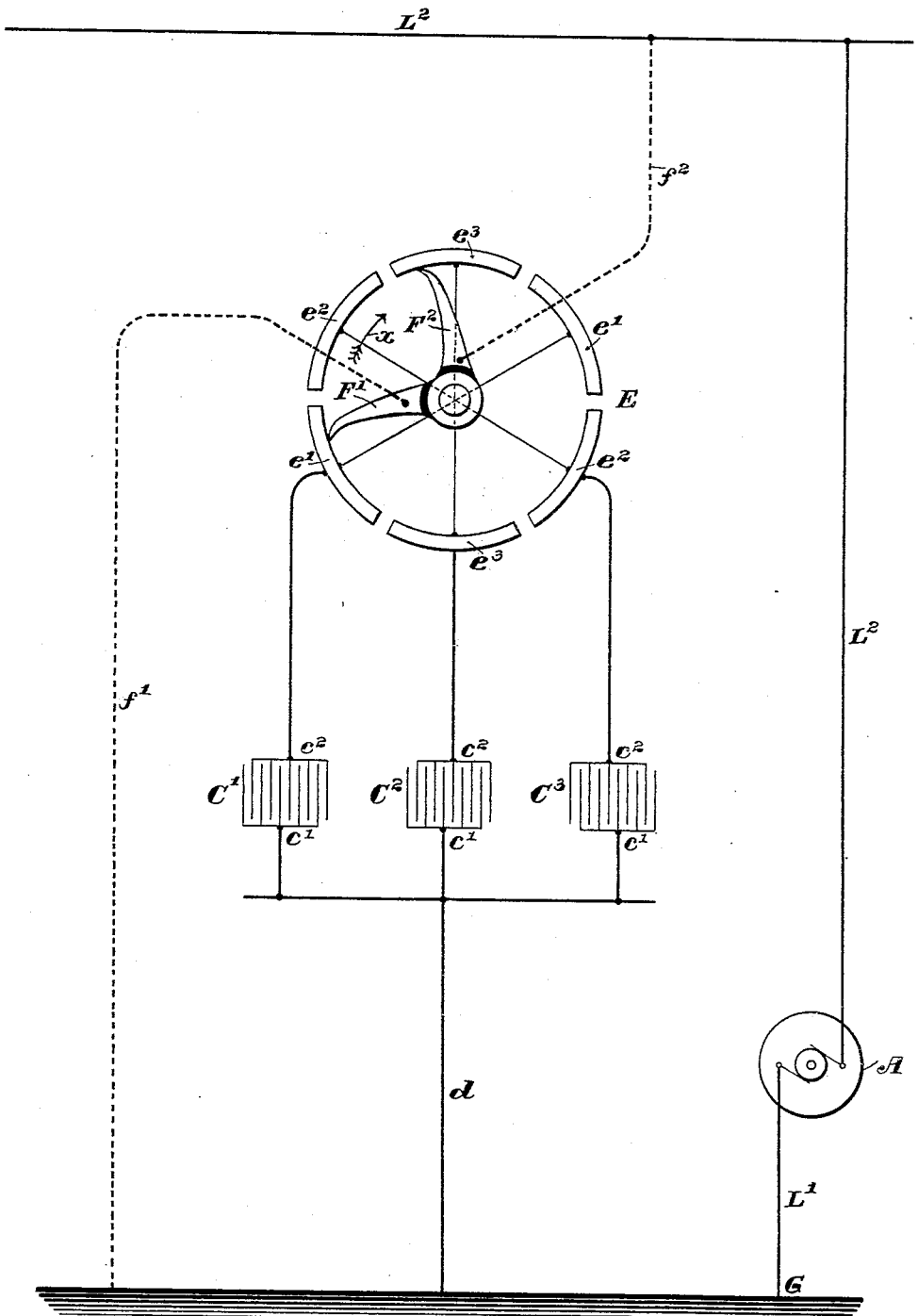
Witnesses
George Brown Jr.
N. I. Tener
Ground.
Inventor
Alexander Wurts.
By his Attorney
Charles A. Terry.

UNITED STATES PATENT OFFICE.

ALEXANDER WURTS, OF PITTSBURG, PENNSYLVANIA, ASSIGNOR TO THE WESTINGHOUSE ELECTRIC AND MANUFACTURING COMPANY, OF SAME PLACE.

LIGHTNING-ARRESTER.

SPECIFICATION forming part of Letters Patent No. 494,186, dated March 28, 1893.

Application filed January 14, 1892. Serial No. 418,064. (No model.)

*To all whom it may concern:*

Be it known that I, ALEXANDER WURTS, a citizen of the United States, residing in the city of Pittsburg, county of Allegheny, and State of Pennsylvania, have invented a new and useful Improvement in Lightning-Arresters, (Case No. 476,) of which the following is a specification.

The invention relates to a means for relieving electric circuits from static charges and preventing injurious disruptive discharges from taking place through the armatures of electric generators and other apparatus where such discharges are liable to cause injury.

In certain conditions of the atmosphere, especially during thunder-storms, electric circuits extending over any considerable area are found to acquire a considerable static charge, and if this is allowed to accumulate, it is liable to result in a disruptive discharge through the insulation of the armature of the machine or through other points, selecting usually the point of weakest insulation. In case the insulation of an armature is thus traversed by an electric discharge, the insulation is further weakened and the current generated within the armature is then liable to follow the short-circuit thus produced, and frequently an armature is in this manner destroyed. Such accumulated static charges also operate in various other ways to injure electrical apparatus. It is desirable, therefore, to relieve the circuit from such static charge as rapidly as it is acquired, and thus maintain the circuit itself at practically the same potential as that of the earth. I have found that by connecting one side of a condenser to the earth and the other side alternately with the main line of a system of electrical distribution and with the earth, the static charge of the line may be effectually removed from the line, thus keeping the line itself, so far as the atmospheric influences are concerned, at practically the same potential as the earth, so that there can be no accumulated charge which will force itself through the armature insulation or elsewhere in the form of a disruptive discharge.

I have found that a convenient plan for carrying this invention into practice consists in providing three condensers, all having one side connected with the earth and the other sides adapted to be connected in succession with the main line conductor of a system of electrical distribution, and to discharge the condensers to earth after each connection with the main line. By thus employing three condensers the line is at all times being discharged and the possibility of a short-circuit being established from the main line conductor to the earth through the circuit controlling device for the condensers is completely obviated. It is not, however, always necessary to employ three condensers, as one, two or more may be employed as found desirable.

In the accompanying drawing I have illustrated diagrammatically a convenient way of carrying out the invention.

Referring to the figure, A represents a generator of electric currents either continuous or alternating in character.

$L'$ represents a main line conductor leading to the ground at G, and $L^2$, a main line conductor leading off to the work-circuit. Three condensers are represented at $C'$, $C^2$, $C^3$. These condensers are of any well-known suitable construction, and they each have one of their plates or sides $c'$ connected with the earth by a conductor $d$. The other plates $c^2$ of the respective condensers are connected with contact-plates $e'$, $e^2$, $e^3$, respectively, of a circuit-controlling device E. This device is provided with two insulated contact-arms, $F'$, $F^2$, which may be driven in any suitable manner, for causing the arms to make contact with the plates $e'$, $e^2$, $e^3$, in succession. The plate $F'$ is connected with the earth by a conductor $f'$, while the arm $F^2$ is connected with the main line $L^2$, by a conductor $f^2$. In the position shown in the drawing, the arm $F'$ is in contact with the plate $e'$, and therefore the plate $c^2$ of the condenser $C'$ is electrically connected through the arm $F'$ and the conductor $f'$ with the earth, and therefore the condenser $C'$ is being discharged. The contact arm $F^2$ is shown as being in contact with the plate $e^3$ and therefore the plate $c^2$ of the condenser $C^2$ is in this manner electrically connected through the plate $e^3$ and arm $F^2$ and conductor $f^2$ with the line $L^2$, and therefore the line $L^2$ is being discharged into the condenser $C^2$. The circuit connections of the condenser $C^3$ are, however, at this moment interrupted. As the arms $F'$, and $F^2$, are revolved in the direction indicated by the arrow $x$, the arm $F'$ will come into contact with the plate $e^2$. The condenser $C^3$ will then be discharged to earth and the connections of the condenser $C^2$ with the line will be interrupted while the condenser $C'$ will be in position to receive a discharge from the line $L^2$. During the further progress of the circuit-closing arms, the condenser $C^2$ will be discharged and the condenser $C^3$ receive a charge from the line $L^2$, and so on, each condenser receiving a charge and during the interval while a succeeding condenser is receiving a charge it will be disconnected and then discharged to the earth. In this manner the line will discharge continuously. By thus separating the moments of charge and discharge by an intervening instant, all danger of momentary short-circuiting will be obviated. In some cases where there is no danger of injury from such causes, two, or even one condenser may be employed; but in general it is desirable to have at least two condensers.

I claim as my invention—

1. In a device for removing a static charge from a conductor, the combination with a single series of contact plates and a condenser for each plate of the series, each condenser having one side connected to its proper contact-plate and having its other side grounded, of two arms adapted to come into contact with said series of contact-plates in order, one of said arms being connected to the conductor to be discharged and the other being grounded, substantially as described.

2. In a device for removing a static charge from a conductor, the combination of a number of sets of contact plates in a single series and condensers equal in number to said sets each having one side connected to all the plates of each set of contacts and the other side connected to earth, of two moving arms adapted to touch said series of contact-plates in order, one of said arms being connected to the conductor to be discharged and the other being grounded, substantially as described.

3. In a device for removing a static charge from a conductor, the combination with a number of sets of contact-plates arranged in a single circular series and condensers equal in number to said sets, each having one side connected to all the plates of each set of contacts, and the other side connected to earth, of two revolving arms adapted to touch said series of contact-plates in order, one of said arms being connected to the conductor to be discharged and the other being grounded, substantially as described.

4. The combination with an electric generator and its circuit of a series of condensers each having one plate connected with the earth and a single series of insulated contact-plates with which the remaining sides of the respective condensers are connected, and two circuit controlling arms for making contact with the respective plates in succession, one of said arms being connected with the circuit and electrical connections from the other contact arm with the earth, substantially as described.

In testimony whereof I have hereunto subscribed my name this 12th day of January, A. D. 1892.

ALEXANDER WURTS.

Witnesses:
JAMES WM. SMITH,
CHARLES A. TERRY.